United States Patent [19]

Goel et al.

[11] Patent Number: 4,822,518
[45] Date of Patent: Apr. 18, 1989

[54] CONVENIENT SYNTHESIS OF POLYAMIDE POLYOL/URETHANE DIOL BLENDS

[75] Inventors: Anil B. Goel, Worthington; Harvey J. Richards, Columbus, both of Ohio

[73] Assignee: Ashland Oil, Inc., Ashland, Ky.

[21] Appl. No.: 131,982

[22] Filed: Dec. 11, 1987

[51] Int. Cl.$^4$ .................. C08G 69/44; C08G 71/04
[52] U.S. Cl. .................... 252/182.26; 525/433; 525/424
[58] Field of Search ................ 525/433, 424; 252/182.26, 182.22

[56] References Cited

U.S. PATENT DOCUMENTS

| | | | |
|---|---|---|---|
| 3,025,323 | 3/1962 | Rose et al. | 528/288 |
| 3,458,456 | 7/1969 | Levy et al. | 528/408 |
| 3,786,031 | 1/1974 | Katayama et al. | 528/48 |
| 4,143,159 | 3/1979 | Moller et al. | 574/788 |
| 4,190,693 | 2/1980 | Martorano et al. | 428/209 |
| 4,448,905 | 5/1984 | Lin et al. | 521/164 |

FOREIGN PATENT DOCUMENTS

| | | |
|---|---|---|
| 2302579 | 8/1973 | Fed. Rep. of Germany . |
| 2509237 | 10/1975 | Fed. Rep. of Germany . |
| 2852785 | 6/1979 | Fed. Rep. of Germany . |
| 3510347 | 2/1957 | Japan . |
| 5832673 | 8/1981 | Japan . |

OTHER PUBLICATIONS

I. S. Lin et al: Lactone–Based Diol Chain Extenders for Polyurethanes, pp. 24–30; Plastics Compounding (Mar.-/Apr. 1985).

*Primary Examiner*—Lewis T. Jacobs
*Assistant Examiner*—Susan Berman
*Attorney, Agent, or Firm*—Wood, Herron & Evans

[57] ABSTRACT

Blends of polyamide polyols and urethane diols are prepared by reacting alkyl (methyl) esters of polybasic acids (preferably dibasic acids) with excess alkanolamine (preferable ethanol amine propanol amine) to form the polyamide polyol of the polybasic acid and alkyl alcohol. The alkyl alcohol is removed and the excess ethanolamine is reacted with ethylene or propylene carbonate to form the urethane diol. This blend of urethane diol and polyamide polyol is useful in various polymer formulations.

6 Claims, No Drawings

CONVENIENT SYNTHESIS OF POLYAMIDE POLYOL/URETHANE DIOL BLENDS

BACKGROUND OF THE INVENTION

To a large extent, functional groups or moieties in a polymer determine the physical characteristics of that polymer.

The presence of functional groups such as urethanes or amides in polymers results in formed polymers having improved properties such as toughness, cross-linking feasibility, hydrogen bonding and so forth. Theoretically, amide and urethane functionalities can be incorporated into polyesters and polyurethanes as amide diols and urethane diols. The amide and urethane moiety would thus be attached to the polymer backbone.

Diamide diols and urethane diols are known. Diamide diol synthesis is difficult and generally results in low purity materials. Further, these diamide diols are solid and incompatible with most systems such as with diisocyanate for urethane type polymers. For this reason, these have not become a polyol of choice in common systems such as polyurethanes. Further, although the synthesis of diamide diols by reacting a dicarboxylic acid with ethanolamine is known it is not straight forward and provides a low purity product.

Synthesis of diamide diols involves the reaction of two to three fold excesses of ethanolamine at around 150° C. followed by removal of excess ethanolamine together with water. From a commercial point of view, this synthesis is not practical since it requires the use of excess ethanolamine. The problem of using equal or slightly more than equivalent amounts of ethanolamine is that the reaction at later stages is very slow. Using higher reaction temperature usually results in some dehydration of diamide diols giving oxazolidone as a by-product.

Formation of urethane diols by reacting ethanolamine with ethylene or propylene carbonate generally must be carried out at temperatures near 60° C. in order to prevent cyclization yielding oxazolidone. But this by itself does not present significant problems.

Several references which discuss amide diols, urethane diols and polymers incorporating either of these include Rose, U.S. Pat. No. 3,025,323; Levy, U.S. Pat. No. 3,458,456; Katayama, U.S. Pat. No. 3,786,031; Martorano, U.S. Pat. No. 4,190,693,; Lin et al, U.S. Pat. No. 4,448,905 and Moller, U.S. Pat. No. 4,143,159.

The Katayama patent discloses the reaction to form a polyamide urethane or polydiamide urethane. This is an extremely complex reaction which incorporates the basic starting unit N-6-hydroxycaproyl amino alcohols or N,N'-di-(6-hydroxycaproyl)-diamines and diisocyanates.

SUMMARY OF THE INVENTION

The present invention is premised on the realization that a blend of diamide diol and urethane diols can be formed conveniently and easily and subsequently incorporated into polymers for formation of an improved polymer at low cost.

The present invention is further premised on the realization that such a polyamide polyol/urethane diol blend can be formed by reacting the alkyl esters of polycarboxylic acids with an excess of alkanolamine followed by capping off the excess alkanolamine with ethylene or propylene carbonate. This process results in a high purity blend of polyamide polyol and urethane diol.

These blends of polyamide polyols with urethane diols can be used in the production of polyesters, polyurethane and polyamide/polymers which can be useful as elastomers, adhesives, foams and so forth.

DETAILED DESCRIPTION

The present invention is a blend of polyamide polyols with urethane diols which is in turn useful in formation of various polymers. In these blends, the ratio of urethane diol to polyamide polyol will generally range from 95% to 65% urethane diol and thus 5% to 35% polyamide polyol.

The polyamide polyols for use in the present invention are the reaction products of alkanolamines such as ethanolamine with the $C_1$-$C_3$ alkyl esters (preferably methyl esters) of polybasic acids including dibasic, tribasic and tetrabasic acids and mixtures of this. The polybasic acids for use in the present invention include $C_4$ to $C_{36}$ polybasic acids. Exemplary acids include succinic acid, glutaric acid, adipic acid, dodecanedioc acid. The alkyl ester of these and other polybasic acids are suitable for use in the present invention. Generally lower alkyl esters are preferred to facilitate separation. Methyl esters are most preferred.

Suitable alkanolamines include $C_2$-$C_{12}$ alkanolamines. Ethanolamine and propanolamine are preferred in part because these are commercially available.

Further, for use in the present invention the urethane diols will be the reaction product of alkanolamines with ethylene or propylene carbonate and lower alkyl derivatives thereof such as methyl or ethyl substituted ethylene and propylene carbonates.

Preferably, the urethane diol is formed in the presence of the amide diol or at the same time as the amide diol is being formed.

According to one method, the polyamide polyol is dissolved in excess alkanolamine at about 60° C. to provide a liquid material. The excess alkanolamine is reacted with the ethylene or propylene carbonate. Since the reaction is exothermic, cooling is necessary in order to maintain the reaction temperature below 95° C. preferably less than 60° C. to avoid oxazolidone formation. This method is disadvantageous because it requires the preformed diamide diol.

According to the preferred method of the present invention, the polyamide polyol/urethane diol blend is formed in situ. According to this method, the alkyl ester of the polybasic acid as defined above is allowed to react with an excess of alkanolamine at a temperature above 110° C. This will form a mixture comprising the polyamide polyol, alkanolamine and alkanol. The formed alkanol is distilled off under vacuum.

Generally the reaction time will be two to three hours at 110° C. to yield polyamide polyol dissolved in excess alkanolamine. The reaction is generally conducted at near atmospheric pressure. After the polybasic acid is reacted, the reactant mixture is cooled to about 50°–60° C.

This reaction mixture is then reacted with molar amounts of ethylene or propylene carbonate (relative to the excess alkanolamine) at a temperature near 60° C. to provide the urethane diol. This part of the reaction is rapid and generally takes one to two hours. After this reaction, any remaining alkanol is removed under vacuum to give the polyamide polyol/urethane diol blends.

Blends with a wide range of urethane diol and polyamide polyol ratios can be obtained. Generally, the urethane diol content can be 65% to an excess of 95% with the remainder being the polyamide polyol. With polyamide polyol concentrations greater than 35%, the polyamide polyol tends to crystallize out slowly over a period of several days forming a waxy material which can be brought back to liquid by warming to about 60° C.

These blends of polyamide polyols with urethane diols can be used in polyester, polyurethane and polyamides which can be useful as elastomers, adhesives, foams, etc. This will be appreciated further in light of the follow detailed examples.

The present invention will be further appreciated in light of the following detailed example.

EXAMPLE 1

To a 3 liter three neck flask equipped with mechanical stirrer, a thermometer, reflux condenser and nitrogen inlet were charged 366 g DBE (dimethyl esters of $C_4$, $C_5$ and $C_6$ dibasic acids) and 1100 g ethanolamine. The reaction mixture was heated at 110° C. with vigorous stirring and the methanol formed in the reaction was distilled off under vacuum. The pot temp was maintained at 110°–115° C. for 3 hours during which time about 33 g of methanol was distilled. The analysis of the sample for TAV indicated it to be 538.6 (58.6% free ethanolamine). The reaction temperature was brought to below 20° C. and ethylene carbonate (1181 g) was added incrementally over about a 30 minute period while the mixture was stirred continuously and the reactor was cooled with ice. The temperature of the reaction mixture was maintained below 50° C. After the complete addition, the mixture was further stirred for 2 hours and the temperature was maintained at 50° C. The mixture was subjected to vacuum to remove methanol. The analysis of the product (blend) indicated it to contain diamide diol and urethane diol in a ratio of 20/80 with TAV 4.9, AV 0.37, base OH-734 and viscosity 8.4 stokes.

EXAMPLE 2

In the same reaction described in example 1, 80 g of DBE-5 (dimethyl ester of glutaric acid) was allowed to react with 195 g of ethanol amine at 110° C. for 2 hours and the methanol produced in the reaction was distilled off. To the reaction mixture containing diamide diol, unreacted ethanolamine and some methanol (analyzed by GLC), was added 184 g of ethylene carbonate at below 20° C. The reaction was exothermic and an ice-bath was used to maintain the reaction temperature below 50° C. After the complete addition, the mixture was further stirred at 50° C. for 2 hours and vacuum stripped (30mm vacuum) with nitrogen bubbling. Analysis (GC) of the mixture indicated the presence of diamide and urethane diol and no starting DBE or ethylene carbonate was observable.

EXAMPLE 3

Diamide diol formed from DBE and ethanolamine was dissolved in excess of ethanolamine followed by the reaction with propylene carbonate. 60 g of diamide diol (DBE based) was dissolved in 70 g of ethanolamine at 60° C. After bringing the solution back to room temperature, 117 g of propylene carbonate was added dropwise over a period of 20 minutes while keeping the stirred reaction mixture temperature below 50° C. After the complete addition, the reaction mixture was stirred at 50° C. for 1 hour and analyzed showing almost complete reaction of ethanolamine.

As indicated, these blends can be simply incorporated into various polymer systems and crosslinked using conventional amide and urethane crosslinking components. This is all well known to one of ordinary skill in the art. This mixture of the present invention provides a method to form and incorporate an amide diol into a polymer system. Further, it provides a combination amide and urethane which enables modification of physical characteristics of a polymer. These can be incorporated into polyesters such as by reaction with dicarboxylic anhydrides and more preferably into polyurethanes by reaction with di-and polyisocyanates. Generally these reactions are well known to those skilled in the art.

Accordingly, having described our invention and the best mode known to us in practicing this invention, we claim:

1. A method of forming a polyamide polyol and urethane diol blend comprising reacting a polyalkyl ester of a polybasic acid with a molar excess of alkanolamine to form a solution including the polyamide polyol, alkanol and excess alkanolamine and reacting a carbonate selected from the group consisting of ethylene carbonate and propylene carbonate and ethyl and methyl substituted derivatives thereof with said excess alkanolamine in the presence of said formed polyamide polyol to form a said blend of polyamide polyol with said urethane diol.

2. The method claimed in claim 1 wherein said ester is a polymethyl ester and said alkanol is methanol.

3. The method claimed in claim 1 wherein said polybasic acid is a dibasic acid.

4. The method claimed in claim 3 wherein said dibasic acid is selected from the group consisting of succinic acid, glutaric acid, adipic acid and dodecanedioc acid.

5. The method claimed in claim 1 wherein the said blend includes from about 5 to about 35% polyamide polyol.

6. The method claimed in claim 1 wherein said alkanolamine is selected from the group consisting of ethanolamine and propanolamine.

* * * * *